US009750003B2

United States Patent
Yu et al.

(10) Patent No.: US 9,750,003 B2
(45) Date of Patent: Aug. 29, 2017

(54) METHOD AND APPARATUS FOR TRANSMITTING AND RECEIVING CONTROL CHANNEL BY BEAMFORMING IN A WIRELESS COMMUNICATION SYSTEM

(71) Applicant: Samsung Electronics Co., Ltd, Gyeonggi-do (KR)

(72) Inventors: Hyun-Kyu Yu, Gyeonggi-do (KR); Tae-Young Kim, Gyeonggi-do (KR); Jeong-Ho Park, Seoul (KR); Cheol Jeong, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 558 days.

(21) Appl. No.: 14/139,533

(22) Filed: Dec. 23, 2013

(65) Prior Publication Data
US 2014/0177561 A1    Jun. 26, 2014

(30) Foreign Application Priority Data

Dec. 21, 2012  (KR) .................... 10-2012-0150353
Dec. 23, 2013  (KR) .................... 10-2013-0161469

(51) Int. Cl.
H04W 72/04    (2009.01)

(52) U.S. Cl.
CPC ........ *H04W 72/042* (2013.01); *H04W 72/046* (2013.01)

(58) Field of Classification Search
CPC ............... H04W 72/046; H04W 72/04; H04W 72/0406; H04W 72/042; H04W 72/1289; H04W 74/0006
See application file for complete search history.

(56) References Cited

U.S. PATENT DOCUMENTS 7,302,238 B2 * 11/2007 Fujii .................... H04B 7/0408
                                                      370/335
2004/0213187 A1   10/2004 Fujii
(Continued)

FOREIGN PATENT DOCUMENTS

CN           101247173 A      8/2008
KR     10-2009-0089770        8/2009
(Continued)

OTHER PUBLICATIONS

Written Opinion of the International Searching Authority dated Mar. 20, 2014 in connection with International Patent Application No. PCT/KR2013/012030, 6 pages.
(Continued)

*Primary Examiner* — Alex Skripnikov
*Assistant Examiner* — Ruihua Zhang

(57) ABSTRACT

A method and apparatus for transmitting and receiving a control channel by beamforming in a wireless communication system are provided. The transmission method includes determining a plurality of pieces of control information to be transmitted on control channels and determining transmission beams for use in beamforming transmission of the plurality of pieces of control information, mapping at least one piece of beam region information indicating at least one beam region in a control channel region and the plurality of pieces of control information to the at least one beam region in the control channel region, at least one piece of control information corresponding to the same transmission beam being arranged in one beam region, and transmitting the mapped beam region information and the mapped control information by transmission beams corresponding to the beam regions in the control channel region.

32 Claims, 13 Drawing Sheets

(56) References Cited

U.S. PATENT DOCUMENTS

| | | |
|---|---|---|
| 2008/0212543 A1 | 9/2008 | Ban |
| 2009/0046582 A1 | 2/2009 | Sarkar et al. |
| 2009/0318157 A1* | 12/2009 | Hoshino ............... H04B 7/0452 |
| | | 455/450 |
| 2010/0027471 A1 | 2/2010 | Palanki et al. |
| 2011/0249633 A1 | 10/2011 | Hong et al. |
| 2012/0020323 A1* | 1/2012 | Noh ......................... H04J 13/00 |
| | | 370/330 |
| 2012/0157140 A1 | 6/2012 | Kim et al. |
| 2012/0250551 A1 | 10/2012 | Sartori et al. |
| 2012/0320874 A1* | 12/2012 | Li ........................... H04W 48/12 |
| | | 370/331 |
| 2013/0044605 A1 | 2/2013 | Lee et al. |
| 2013/0121185 A1* | 5/2013 | Li ......................... H04W 72/046 |
| | | 370/252 |
| 2013/0148623 A1 | 6/2013 | Nishio et al. |
| 2013/0155990 A1* | 6/2013 | Nishio .................. H04L 5/0053 |
| | | 370/329 |
| 2014/0050187 A1 | 2/2014 | Nakshima et al. |
| 2014/0128109 A1* | 5/2014 | Li ........................... H04W 68/02 |
| | | 455/458 |
| 2014/0133346 A1* | 5/2014 | Kang ..................... H04W 24/10 |
| | | 370/252 |

FOREIGN PATENT DOCUMENTS

| | | | |
|---|---|---|---|
| WO | WO 2012/029244 A1 | 3/2012 | |
| WO | WO 2012/029245 A1 * | 3/2012 | ............ H04W 72/04 |
| WO | WO 2012/147577 A1 | 11/2012 | |

OTHER PUBLICATIONS

International Search Report dated Mar. 20, 2014 in connection with International Patent Application No. PCT/KR2013/012030, 5 pages.

Extended European Search Report dated Jul. 22, 2016 in connection with European Application No. 13864613.8, 8 pages.

Foreign Communication from Related Counterpart Application, Chinese Patent Application No. 201380067606.0, First Chinese Office Action dated May 24, 2017, 24 pages.

* cited by examiner

METHOD AND APPARATUS FOR TRANSMITTING AND RECEIVING CONTROL CHANNEL BY BEAMFORMING IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of Korean Patent Application No. 10-2012-0150353, filed Dec. 21, 2012, and Korean Patent Application No. 10-2013-0161469, filed Dec. 23, 2013, in the Korean Intellectual Property Office, the entire disclosures of which are incorporated herein by reference.

TECHNICAL FIELD

The present disclosure relates generally to signal transmission and reception in a wireless communication system, and more particularly, to a method and apparatus for transmitting and receiving a control channel by beamforming in a wireless communication system.

BACKGROUND

To satisfy ever-increasing demands for wireless data traffic, wireless communication systems have been developed to support higher data rates. A $4^{th}$ Generation (4G) mobile communication system under commercialization seeks to increase data rates mainly by improving spectral efficiency. However, it is difficult to satisfy the drastically increasing demands for wireless data traffic only through spectral efficiency improvement.

The above problem may be solved by using a very wide frequency band. The cellular mobile communication systems use frequency bands of 10 GHz or less, with difficulty in securing a wide frequency band.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for transmitting and receiving a signal in a communication system.

Certain embodiments of the present disclosure provide a method and apparatus for transmitting and receiving a physical control channel by beamforming in a communication system.

Certain embodiments of the present disclosure provide a method and apparatus for reducing the complexity of searching for and detecting a scheduling assignment channel at a Mobile Station (MS) in a wireless communication system using beamforming.

In accordance with certain embodiments of the present disclosure, there is provided a method for transmitting a control channel by beamforming in a wireless communication system. The method includes determining a plurality of pieces of control information to be transmitted on control channels and determining transmission beams for use in beamforming transmission of the plurality of pieces of control information, mapping at least one piece of beam region information indicating at least one beam region in a control channel region and the plurality of pieces of control information into the at least one beam region in the control channel region, at least one piece of control information corresponding to the same transmission beam from among the plurality of pieces of control information being arranged in one beam region in the control channel region, and transmitting the mapped beam region information and the mapped control information by a transmission beam corresponding to each of the at least one beam region in the control channel region.

In accordance with certain embodiments of the present disclosure, there is provided a method for receiving a control channel by beamforming in a wireless communication system. The method includes detecting beam region information corresponding to an intended transmission beam at at least one of predetermined resource positions in a control channel region having predetermined time-frequency resources, the control channel region including at least one beam region each carrying at least one piece of control information allocated to the same transmission beam, and detecting intended control information in a beam region indicated by the beam region information, using the beam region information.

In accordance with certain embodiments of the present disclosure, there is provided a base station for transmitting a control channel by beamforming in a wireless communication system. The base station includes a control channel generator configured to determine a plurality of pieces of control information to be transmitted on control channels, a controller configured to determine transmission beams for use in beamforming transmission of the plurality of pieces of control information and to map at least one piece of beam region information indicating at least one piece of beam region in a control channel region and the plurality of pieces of control information into beam regions in the control channel region, at least one piece of control information corresponding to a same transmission beam from among the plurality of pieces of control information being arranged in one beam region in the control channel region, and a transmitter configured to transmit the mapped beam region information and the mapped control information by a transmission beam corresponding to the at least one beam region in the control channel region.

In accordance with certain embodiments of the present disclosure, there is provided a mobile station for receiving a control channel by beamforming in a wireless communication system. The mobile station includes a receiver configured to receive a signal in a control channel region having predetermined time-frequency resources, and a control channel detector configured to detect beam region information corresponding to an intended transmission beam at at least one of predetermined resource positions from the signal received in the control channel region, the control channel region including at least one beam region each carrying at least one piece of control information allocated to the same transmission beam, and to detect intended control information in a beam region indicated by the beam region information, using the beam region information.

Other aspects, advantages, and salient features of the disclosure will become apparent to those skilled in the art from the following detailed description, which, taken in conjunction with the annexed drawings, discloses embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
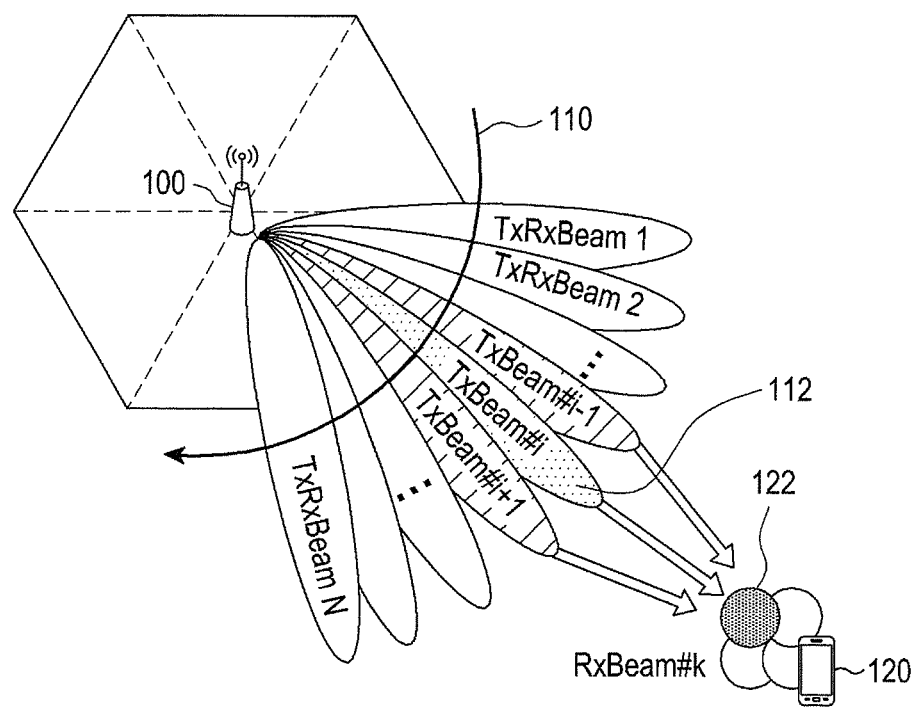
FIG. 1 illustrates beamforming-based communication according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of embodiments of the disclosure as defined by the claims and their equivalents. It includes various specific details to assist in that understanding but these are to be regarded as merely. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Accordingly, there is a need for securing a wideband frequency in a higher frequency band. As a higher frequency is used for wireless communication, propagation path loss is increased. The resulting shortened propagation distance leads to reduction of service coverage. One of important techniques developed to decrease propagation path loss and increase a propagation distance is beamforming in an extremely high frequency system called a MilliMeter Wave (MMW) system introduced to secure a wide frequency band.

Beamforming can be classified into transmission beamforming at a transmitter and reception beamforming at a receiver. In general, the transmission beamforming increases directivity by steering and focusing a beam in a specific direction, that is, toward a specific propagation area through a plurality of antennas. A set of the antennas can be referred to as an antenna array and each antenna of the antenna array can be referred to as an array element. Various types of antenna arrays such as linear array, planar array, and the like are available. The signal directivity increased by transmission beamforming results in a lengthened transmission distance. Furthermore, since almost no signal is transmitted in a direction other than the steered direction, signal interference with other receivers is significantly reduced. A receiver performs beamforming on a received signal by means of a reception antenna array. Reception beamforming increases the reception sensitivity of a signal directed from an intended direction and excluding signals directed from the other directions from reception by focusing signal reception in a specific direction. Consequently, reception beamforming offers the benefit of blocking an interference signal.

For a communication system using the above-described beamforming, there is a need for defining an efficient resource configuration and efficient control information signaling in order to effectively apply beamforming to a physical channel according to the characteristics of the physical channel and transmit a physical channel signal by beamforming.

Embodiments of the present disclosure relate to a technique for transmitting and receiving a control channel by beamforming in a cellular mobile communication system. The following description will be given in the context of a Physical Downlink Control Channel (PDCCH) that provides allocation information about Downlink (DL) and Uplink (UL) data packets, as an example of the control channel. Herein, it is to be clearly understood that embodiments of the present disclosure described below are applicable to all types of communication systems using beamforming for transmission of a plurality of allocated control channels. For example, embodiments of the present disclosure are applicable to at least one of a Physical Hybrid Automatic Repeat reQuest (HARQ) Indication Channel (PHICH) carrying a HARQ ACKnowledgement (ACK)/Negative ACK (NACK), a short data channel, and a dedicated Reference Signal (RS), as well as a PDCCH.

For the purpose of overcoming propagation path loss in an extremely high frequency band, the PDCCH is transmitted by beamforming. DL beamforming is performed by at least one Transmission (Tx) beam of a Base Station (BS) and/or at least one Reception (Rx) beam of a Mobile Station (MS).

FIG. 1 illustrates beamforming-based communication according to embodiments of the present disclosure. Referring to FIG. 1, a BS 100 manages a cell divided into one or more sectors as its service coverage and forms a plurality of Tx beams 112 using a digital beamforming structure and/or an analog beamforming structure. The BS 100 transmits a plurality of beamformed signals by sweeping them simultaneously or successively, as indicated by reference numeral 110.

A MS 120 located within the cell of the BS 100 is configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the MS 120 does not support Rx beamforming, the MS 120 measures the channel quality of a reference signal in each Tx beam and reports the measurements to the BS 100. The BS 100 selects a best beam(s) for the MS 120 from among a plurality of Tx beams, for communication with the MS 120. If the MS 120 is configured to support Rx beamforming, the MS 120 measures the channel qualities of a plurality of Tx beams 112 received from the BS 100 with respect to each Rx beam 122 and reports total or some high-ranked measurements of all Tx-Rx beam pairs to the BS 100. The BS 100 allocates an appropriate Tx/Rx beam pair to the MS 120. If the MS 120 is capable of receiving a plurality of Tx beams from the BS 100 or supporting a plurality of BS Tx-MS Rx beam pairs, the BS 100 selects a beam, taking into account diversity transmission through repeated transmission or simultaneous transmission. This procedure for selecting the best beam(s) for transmission and reception between the BS 100 and the MS 120 is called a beam selection procedure or a beam tracking procedure.

The MS 120 feeds back information about one or more best Tx beams determined for the BS 100 to the BS 100, periodically or aperiodically. Before assignment of data transmission scheduling for the MS 120, the BS 100 acquires information about the best Tx beam or the best Tx-Rx beam pair from the MS 120. Irrespective of whether the MS 120 communicates with a single BS (sector or Remote Radio Head (RRH)) or a plurality of BSs (sectors or RRHs), the MS 120 reports information about the best Tx beam or the best Tx-Rx beam pair selected for each BS to the BS, all BSs, or a selected BS.

The BS 100 transmits a PDCCH to the MS 120 by a Tx beam selected from best P Tx beams indicated by a feedback received from the MS 120. To perform Rx beamforming, the MS 120 needs to have knowledge of the Tx beam selected by the BS 100. Therefore, a rule of selecting a Tx beam for a PDCCH by the BS 100 is agreed on in advance between the BS 100 and the MS 120 before the PDCCH transmission. In embodiments of the present disclosure, the BS 100 selects the best Tx beam from among P best Tx beams and transmits the PDCCH to the MS 120 by the selected Tx beam. A decision is made as to whether a Tx beam is the best according to some metrics such as a received signal strength measurement of each Tx beam, a reception Signal to Interference and Noise Ratio (SINR) measurement of each Tx beam, the number of transmission RF chains in the BS, the BS's preference, and the like. The BS 100 selects a Tx beam for a PDCCH by an algorithm known to the MS 120 or signals information about the selected Tx beam for the PDCCH of the MS 120 (i.e., the index of the selected Tx beam) to the MS 120.

The BS 100 transmits the PDCCH by a beam having a predetermined beamwidth to the MS 120. If the beamwidth of a best Tx beam indicated by the feedback transmitted by the MS 120 is different from the beamwidth determined for the PDCCH, the BS 100 selects a Tx beam for the PDCCH according to the Tx beam selection rule agreed on in advance between the BS 100 and the MS 120 before the PDCCH transmission. For example, if the P best Tx beams indicated by the feedback received from the MS 120 are narrower than a beam for a PDCCH, the BS 100 selects a wider Tx beam including the best Tx beam of the P best Tx beams.

If the BS 100 is capable of transmitting a PDCCH in a different beamwidth for each UE, that is, if the system supports a plurality of beam types for PDCCH transmission, the BS 100 selects a beam type for a PDCCH to be transmitted to the MS 120 before the PDCCH transmission.

Figure 2:
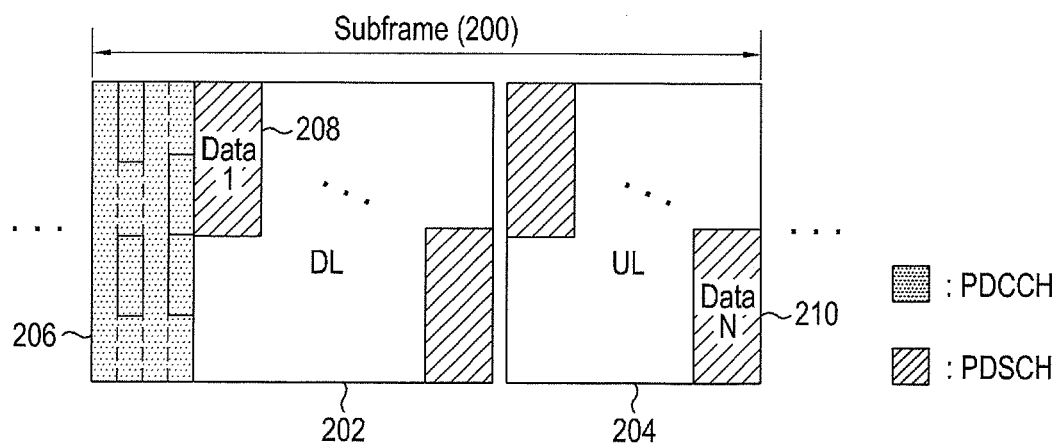
FIG. 2 illustrates a Physical Downlink Control Channel (PDCCH) transmission region according to embodiments of the present disclosure.

FIG. 2 illustrates a PDCCH transmission region according to embodiments of the present disclosure. While a Time Division Duplexing (TDD) subframe is shown in FIG. 2, it is to be clearly understood that the same or similar description is applicable to a Frequency Division Duplexing (FDD) subframe.

Referring to FIG. 2, a subframe 200 spanning a predetermined time period includes a control channel region 206 carrying control channels, a DL data region 202 carrying DL data 208, and a UL data region 204 carrying UL data 210. If N data packets 208 and 210 are transmitted in the data regions 202 and 204, N PDCCHs are included in the control channel region 206 defined at the start of the subframe 200, to provide scheduling information (or scheduling assignments) about the data packets 208 and 210, respectively. The data packets 208 and 210 are transmitted to different MSs by different Tx beams and the control channel region 206 includes PDCCHs transmitted by various Tx beams according to a scheduling result.

Each MS decodes only a PDCCH directed to the MS successfully. In addition, the MS attempts to decode only a signal transmitted by a Tx beam optimal for the MS according to pre-acquired best Tx beam information.

Figure 3A:
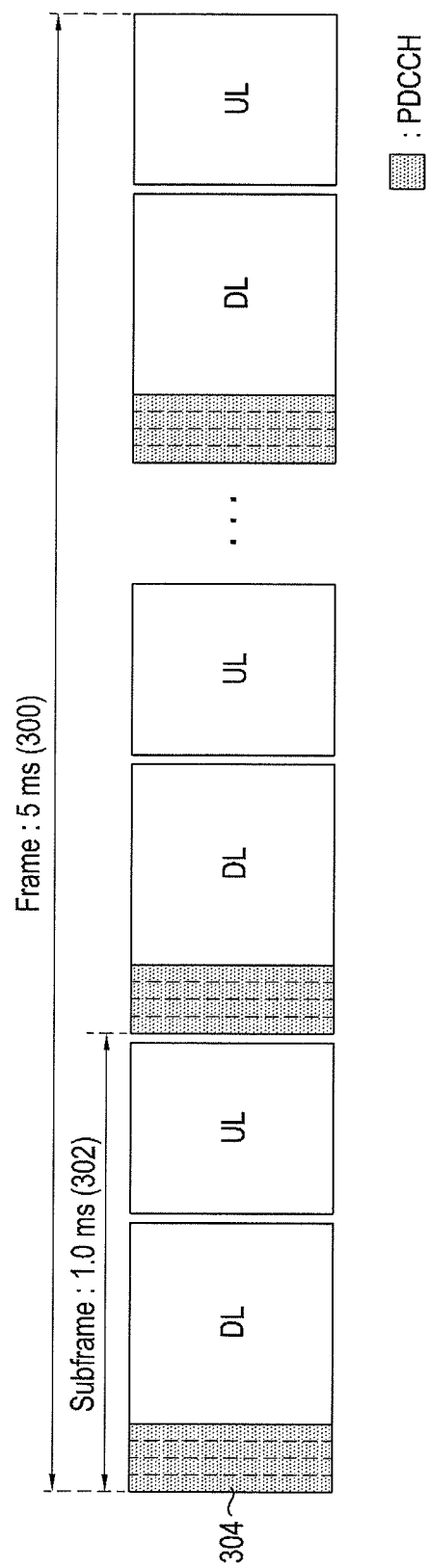
FIGS. 3A and 3B illustrate a PDCCH allocation according to embodiments of the present disclosure.
Figure 3B:
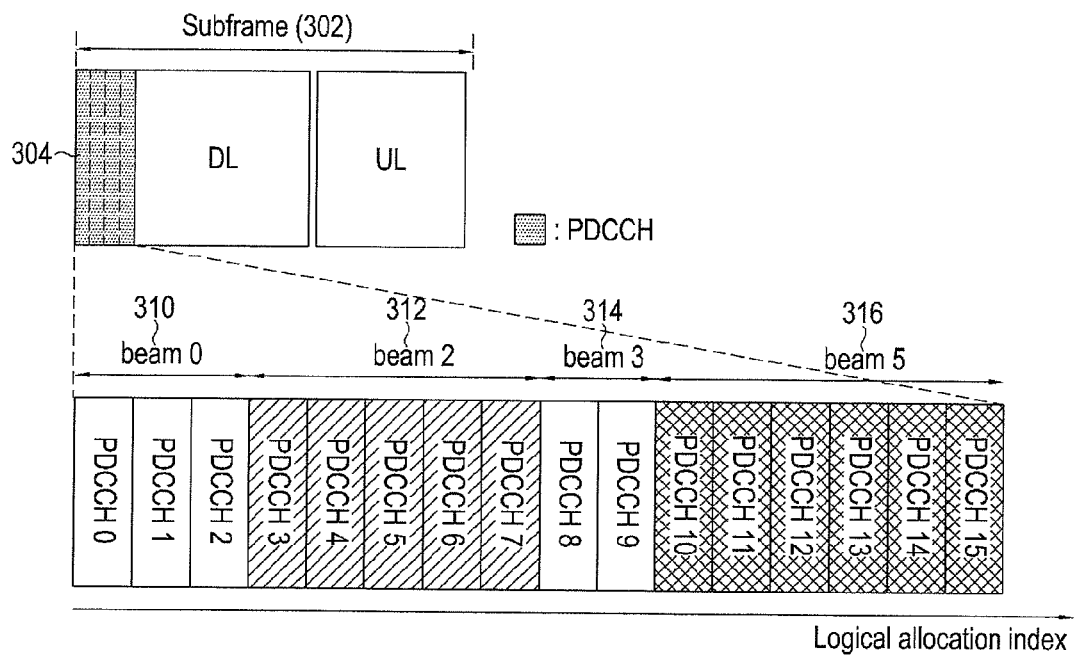

FIGS. 3A and 3B illustrate a PDCCH allocation according to embodiments of the present disclosure.

Referring to FIG. 3A, one frame 300 includes a predetermined number of subframes 302. A control channel region 304 including PDCCHs is located at the start of each subframe 302. The control channel region 304 includes PDCCHs carrying scheduling information about data packets transmitted in a subsequent DL/UL data region. The PDCCHs are arranged in the control channel region 304 in such a manner that PDCCHs allocated to the same beam are successive.

Referring to FIG. 3B, 16 PDCCHs (namely, PDCCH 0 to PDCCH 15) carrying scheduling assignments for different users or different data packets (or control packets) are included in the control channel region 304 and PDCCHs allocated to the same beam are arranged logically successively. For example, each of the PDCCHs includes one or more time-frequency resource units and the PDCCHs are arranged logically successively on a time axis and/or a frequency axis. Specifically, PDCCH 0, PDCCH 1, and PDCCH 2 allocated to DL Tx beam 0 are successively arranged in a beam region 310, PDCCH 3 to PDCCH 7 allocated to DL Tx beam 2 are successively arranged in a beam region 312, PDCCH 8 and PDCCH 9 allocated to DL Tx beam 3 are successively arranged in a beam region 314, and PDCCH 10 to PDCCH 15 allocated to DL Tx beam 5 are successively arranged in a beam region 316. A Tx beam allocated to each PDCCH is determined through BS scheduling, taking into account best Tx beams for MSs.

Each of the beam regions 310, 312, 314, and 316 is a region in which a plurality of PDCCHs allocated to one Tx beam are arranged and the beam regions 310, 312, 314, and 316 are arranged in an ascending or descending order of beam indexes. The beam regions 310, 312, 314, and 316 are shown in FIG. 3B as arranged in an ascending order of beam indexes, as an example.

The BS subjects the PDCCHs included in the same beam region to separate coding or joint coding. In separate coding, the BS encodes the PDCCHs individually. Thus, while the separate coding offers the advantage of link adaptation for each UE, the separate coding may increase signaling overhead because information about the positions of resources allocated to a PDCCH for each MS and a Modulation and Coding Scheme (MCS) applied to coding of the PDCCH needs to be transmitted to the MS. If signaling is omitted or reduced, the MS needs to perform blind detection for the PDCCH directed to the MS, thereby increasing the computation complexity of the MS. On the other hand, while joint coding is inefficient in terms of link adaptation due to select of a MCS based on a PDCCH to be transmitted most robustly from among PDCCHs transmitted in a beam region, joint coding may reduce signaling overhead or the computation complexity of MSs because only information about the positions of resources allocated to all PDCCHs and information about only one MCS needs to be transmitted to the MSs.

If PDCCHs are separately encoded, PDCCHs allocated to the same beam is not arranged logically successively and there exists logical time-frequency resources that carry no control information, between some PDCCHs.

In certain embodiments of the present disclosure, the beam regions 310, 312, 314, and 316 to which the PDCCHs are allocated are divided according to the indexes of antenna arrays and arranged in an ascending or descending order of the indexes of the antenna arrays.

Figure 3C:
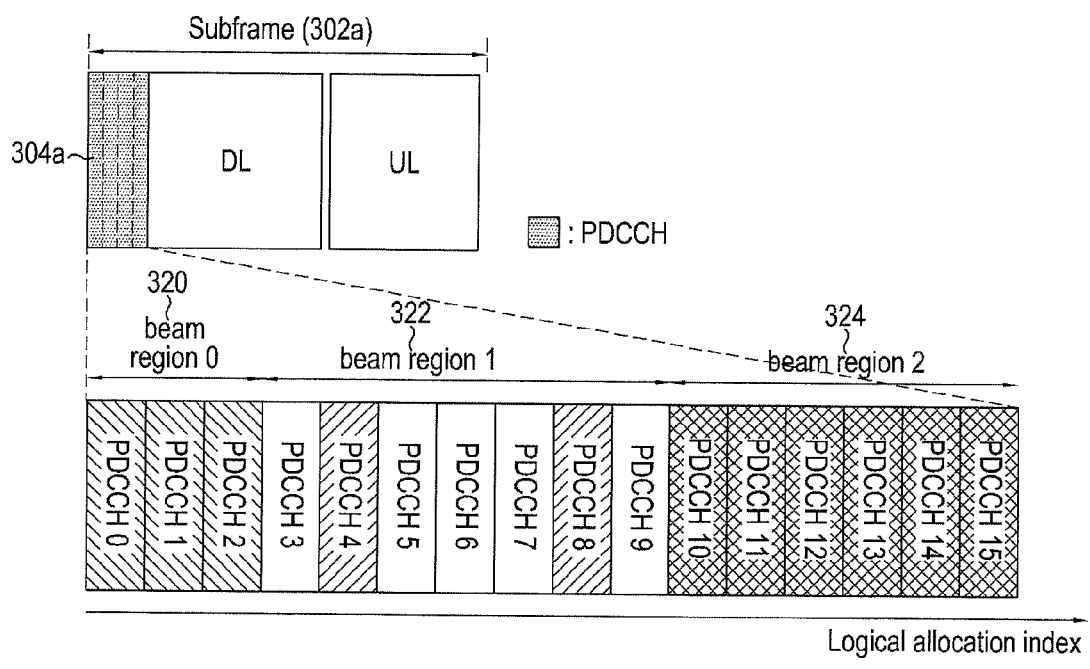
FIG. 3C illustrates a PDCCH allocation according to embodiments of the present disclosure.

FIG. 3C illustrates a PDCCH allocation according to embodiments of the present disclosure.

Referring to FIG. 3C, a control channel region 304a including PDCCHs resides at the start of each subframe 302a. The control channel region 304a includes PDCCHs carrying scheduling information about data packets included in a subsequent DL/UL data region and the PDCCHs are arranged in the control channel region 304a in such a manner that PDCCHs allocated to the same beam are successive.

In FIG. 3C, 16 PDCCHs (namely, PDCCH 0 to PDCCH 15) carrying scheduling assignments for different users or different data packets (or control packets) are included in the control channel region 304a and PDCCHs are arranged logically successively in each of beam regions 320, 322, and 324. Specifically, PDCCH 0, PDCCH 1, and PDCCH 2 allocated to DL Tx beam 0 are successively arranged in the beam region 320 (beam region 0), and PDCCH 10 to PDCCH 15 allocated to DL Tx beam 5 are successively arranged in the beam region 324 (beam region 2). Particularly, the beam region 322 (beam region 1) includes PDCCH 3 to PDCCH 9 allocated to Tx beam 2 and Tx beam 3. That is, PDCCHs 3, 5, 6, 7, and 9 are transmitted by Tx beam 2 and PDCCHs 4 and 8 are transmitted by Tx beam 3. Accordingly, the PDCCHs of beam region 1 are jointly encoded by a BS.

If PDCCHs are transmitted in beams having various beamwidths, each beam region is formed based on the largest of the beamwidths and includes a PDCCH allocated to a beam having a smaller beamwidth included in the beam of the beam region.

The BS transmits information about each beam region in the control channel region so that MSs receiving the control channel region recognizes each beam region. A resource region carrying the information about each beam region is called a Physical Control Format Indicator Channel (PCFICH) or a Physical Beam Region Format Indicator Channel (PBFICH). The beam region information transmitted on the PCFICH is configured as a sequence or a message and encoded so robustly that all MSs for which PDCCHs are allocated to the beam region receives the beam region information successfully on the PCFICH. A PCFICH is transmitted for each beam region and two PCFICHs occupying different time-frequency resources are transmitted for the beam region 322 illustrated in FIG. 3C.

Figure 4A:
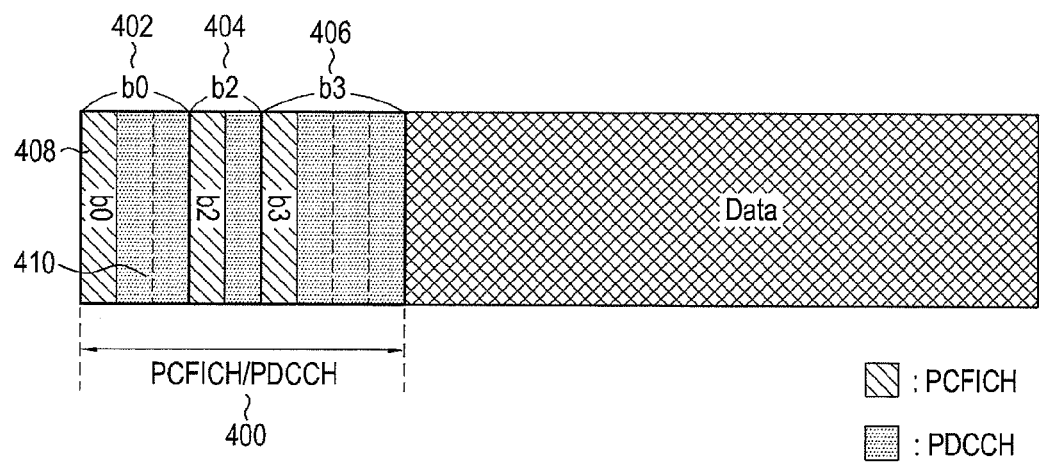
FIGS. 4A and 4B illustrate configurations of a control channel region according to embodiments of the present disclosure.

FIG. 4A illustrates a configuration of a control channel region according to embodiments of the present disclosure.

Referring to FIG. 4A, a control channel region 400 includes one or more PCFICHs and one or more control channels, for example, PDCCHs associated with the PCFICHs. The (maximum) size of the control channel region 400 is preset or is signaled to a MS in system information or control information by a BS. Each PCFICH is disposed at the start of a beam region to which an associated PDCCH belongs to in the time domain, carrying information about the beam region. For example, the beam region information transmitted on the PCFICH includes, for example, information about at least one of a beam index indicating a Tx beam mapped to the beam region, the size of the beam region, the types (or format) and positions of control channels transmitted in the beam region, the size of control information transmitted on the control channels, and a MCS applied to the control channels. The size of the beam region is indicated as, for example, a resource size of the control channels in the beam region and/or the number of OFDM symbols in the beam region. The position of the control channel is, for example, a start offset indicating the first resource unit of the control channel.

In certain embodiments of the present disclosure, each PCFICH disposed at the start of a beam region corresponding to the PCFICH commonly includes information about all beam regions 402, 404, and 406 in the control channel region 400 (e.g., the beam indexes and sizes of the beam regions 402, 404, and 406). Accordingly, a MS acquires information about the beam regions 402, 404, and 406 or a beam region corresponding to a best Tx beam for the MS just by decoding any one of the PCFICHs (e.g., a first PCFICH or a PCIFCH transmitted by the best Tx beam of the MS). A specific PCFICH carries information about a PDCCH that is not actually transmitted (a PDCCH allocated to Tx beam b1 in FIG. 4A). In this case, the PCFICH indicates no PDCCH allocation to Tx beam b1.

Specifically, the control channel region 400 includes the first beam region 402 including two PDCCHs allocated to Tx beam 0, b0, the second beam region 404 including one PDCCH allocated to Tx beam 2, b2, and the third beam region 406 including three PDCCHs allocated to Tx beam 3, b3. First beam region information 408 indicating the first beam region 402 is located at the start of the first beam region 402, followed by the two PDCCHs 410 allocated to Tx beam 0, b0. Second beam region information indicating the second beam region 404 is located at the start of the second beam region 404, followed by the PDCCH allocated to Tx beam 2, b2. Third beam region information indicating the third beam region 406 is located at the start of the third beam region 406, followed by the three PDCCHs allocated to Tx beam 3, b3. Beam region information indicating a beam region is transmitted using the same Tx beam as a PDCCH(s) allocated to the beam region. For example, the first beam region information 408 is transmitted by Tx beam 0, b0, like the PDCCHs 410.

Each of resource units available for transmission of beam region information on a PCFICH is configured with one or more time units (e.g., one or more Orthogonal Frequency Division Multiplexing (OFDM) symbols) and one or more frequency units (e.g., one or more subcarriers). The format of the beam region information transmitted on the PCFICH is known to a MS before PCFICH reception and the size of the beam region information is preset according to the format. For example, a predetermined format is permanently used for the beam region information or the BS indicates the format of the beam region information to the MS by system information on a Broadcasting Channel (BCH).

The position of a resource available to the PCFICH is determined according to a preset criterion. For example, it is regulated that a PCFICH is transmitted in every fourth resource unit in a control channel region according to an available size of scheduling information transmitted on a PDCCH. Then the MS detects every fourth resource unit in the control channel region 400 to detect an intended PCFICH, instead of detecting all resource units of the control channel region 400.

To detect the position of a beam region including an intended PDCCH, the MS decodes PCFICHs in all resource units available for PCFICH transmission (e.g., every fourth resource unit in a control channel region). If the MS succeeds in decoding a PCFICH corresponding to a Tx beam optimal for the MS (e.g., Tx beam #b), the MS detects its PDCCH at an accurate position using the decoded beam region information. Otherwise, the MS sleeps until receiving a next PCIFCH.

If the MS succeeds in decoding the detected PDCCH and determines that scheduling information included in the PDCCH is directed to the MS, the MS decodes a data packet or a control packet in a data region indicated by the scheduling information. Otherwise, the MS sleeps until receiving a next PCFICH.

Each PCFICH is configured to be detected only by a MS that wants a Tx beam of a beam region related to the PCFICH. In embodiments of the present disclosure, the BS transmits beam information about the MS by a Reference Signal (RS) in a resource unit including beam region information for the MS in order to reduce the MS complexity of detecting the transmission position of an intended PCFICH. The RS is inserted into the resource unit including the beam region information in a predetermined pattern. For example, the BS scrambles the RS with a sequence mapped to the beam index of a Tx beam for the MS, prior to transmission. Then the MS readily detects the resource unit including its beam region information by descrambling the received RS with the sequence. That is, the MS measures RS-based signal power by descrambling each of RSs received in resource units available for PCFICH transmission with a sequence mapped to a Tx beam known to the MS as applied to a PDCCH and attempts to decode a PCFICH in a resource unit including a RS having a signal power measurement exceeding a threshold.

Figure 4B:
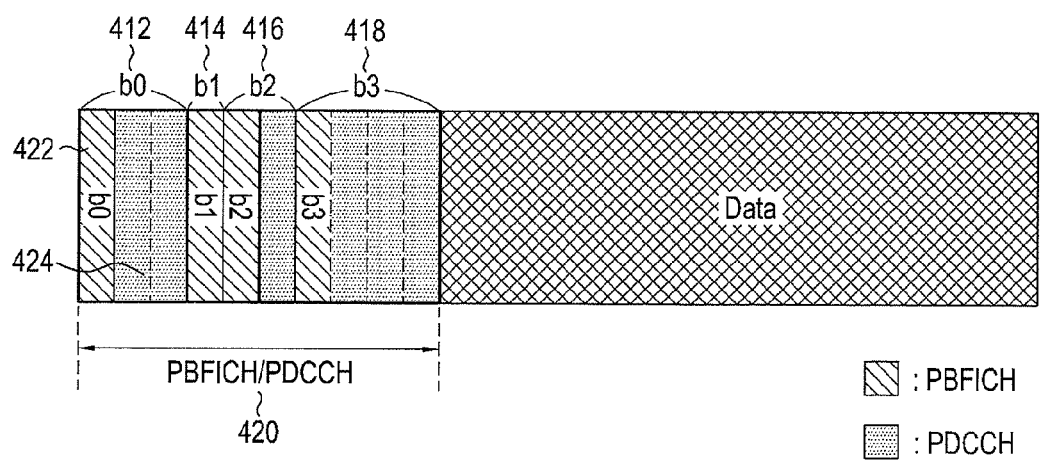

FIG. 4B illustrates a configuration of a control channel region according to embodiments of the present disclosure.

Referring to FIG. 4B, a control channel region 420 includes a plurality of PBFICHs and one or more control channels, for example, PDCCHs. The (maximum) size of the control channel region 420 is preset or is signaled to a MS in system information or control information by a BS. The control channel region 420 includes a plurality of beam regions 412, 414, 416, and 418 corresponding to a plurality of Tx beams supported by the BS and a PBFICH carrying information about an associated beam region is disposed at the start of each of the beam regions 412, 414, 416, and 418. Beam region information transmitted on each PBFICH includes, for example, information about at least one of a beam index indicating a beam mapped to a beam region corresponding to the PBFICH, the size of the beam region, the type (or format) and position of control channels transmitted in the beam region, the size of control information transmitted on the control channels, and a MCS applied to the control channels. The size of the beam region is indicated, for example, by the size of resources for PDCCHs included in the beam region, the size of resources for PHICHs included in the beam region, and/or the number of OFDM symbols included in the beam region.

In certain embodiments of the present disclosure, each PBFICH disposed at the start of a beam region corresponding to the PBFICH commonly includes information about all of the beam regions 412, 414, 416, and 418 (e.g., the beam indexes and sizes of the beam regions 412, 414, 416, and 418). Therefore, a MS acquires information about all of the beam regions 412, 414, 416, and 418 just by decoding only one of the PBFICHs. Each PBFICH includes information about a PDCCH that is actually not transmitted (a PDCCH allocated to Tx beam b1 in FIG. 4B). In this case, the PBFICH indicates the absence of no PDCCH allocation to Tx beam b1. In addition, each PBFICH does not include a beam index and thus the MS identifies a Tx beam corresponding to a beam region associated with the PBFICH based on the detection order (position) of the PBFICH.

Specifically, the control channel region 420 includes the first beam region 412 with one PBFICH and two PDCCHs allocated to Tx beam 0, b0, the second beam region 414 with one PBFICH, the third beam region 416 with one PBFICH and one PDCCH allocated to Tx beam 2, b2, and the fourth beam region 418 with one PBFICH and three PDCCHs allocated to Tx beam 3, b3. Channels of each of the beam regions 412, 414, 416, and 418 are transmitted by a Tx beam corresponding to the beam region. For example, a PBFICH 422 and PDCCHs 424 of the first beam region 412 are transmitted by Tx beam 0.

Figure 5:
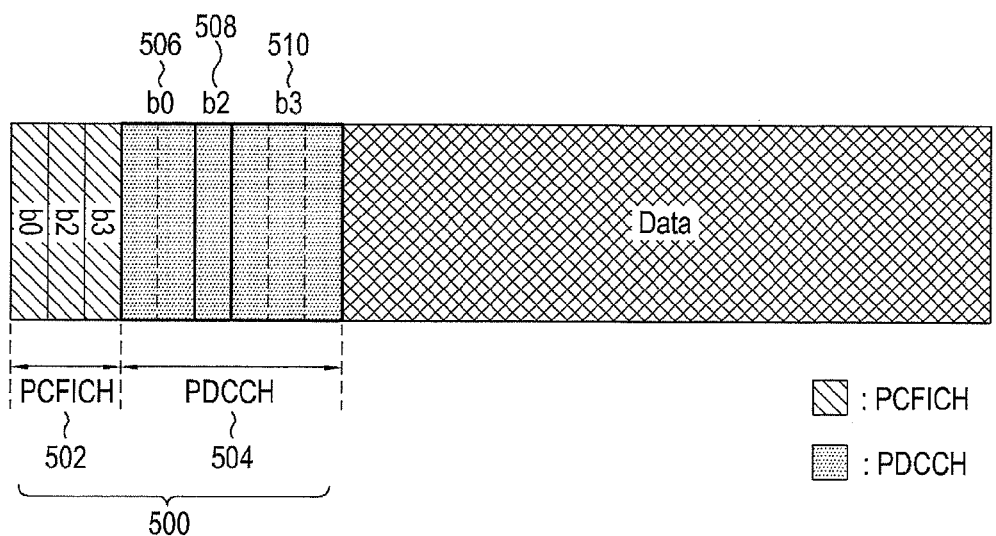
FIG. 5 illustrates a configuration of a control channel region according to embodiments of the present disclosure.

FIG. 5 illustrates a configuration of a control channel region according to embodiments of the present disclosure.

Referring to FIG. 5, a control channel region 500 includes one or more PCFICHs 502 and one or more control channels, for example, one or more PDCCHs 504 associated with the PCFICHs 502. The size of the control channel region 500 is preset or is signaled to a MS in system information or control information by a BS. The PCFICHs 502 are arranged successively at the start of the control channel region 500, followed by the PDCCHs 504 in the time domain. In embodiments of the present disclosure, the PCFICHs 502 are arranged in the same order of the PDCCHs 504 associated with the PCFICHs 502. Each PCFICH includes information about a beam region corresponding to the PCFICH (i.e. the beam index and size/position of the beam region).

In certain embodiments of the present disclosure, the PCFICHs 502 disposed at the start of the control channel region 500 commonly include information about all of beam regions 506, 508, and 510 (e.g., the beam indexes and sizes of the beam regions 506, 508, and 510). Accordingly, a MS acquires information about the beam regions 506, 508, and 510 just by decoding one of the PCFICHs 502. Each PCFICH includes information about a PDCCH that is actually not transmitted (a PDCCH allocated to Tx beam b1 in FIG. 5). In this case, the PCFICH indicates no PDCCH allocation to Tx beam b1.

Specifically, PCFICH 0 associated with Tx beam 0, b0, PCFICH 2 associated with Tx beam 2, b2, and PCFICH 3 associated with Tx beam 3, b3 are arranged in the control channel region 500, followed by two PDCCHs 506 allocated to Tx beam 0, b0, a PDCCH 508 allocated to Tx beam 2, b2, and three PDCCHs 510 allocated to Tx beam 3, b3. The PCFICHs 502 are arranged in the same order of beam regions corresponding to the PCFICHs 502 or independently of the beam regions. In certain embodiments of the present disclosure, the PCFICHs 502 carry identification information about beam regions corresponding to the PCFICHs 502 (i.e. the beam indexes of the beam regions corresponding to the PCFICHs 502). Beam region information of each PCFICH is transmitted by the same Tx beam as applied to a PDCCH(s) associated with the PCFICH. For example, first beam region information about the beam region 506 is transmitted by Tx beam 0. In the configuration illustrated in FIG. 5, beam region information transmitted on a PCFICH includes information about the position of a beam region corresponding to the PCFICH as well as information about the size of the beam region. The position of the beam region is indicated, for example, by a start offset indicating the starting resource unit of the beam region and the number of resource units occupied by the beam region.

Figure 6:
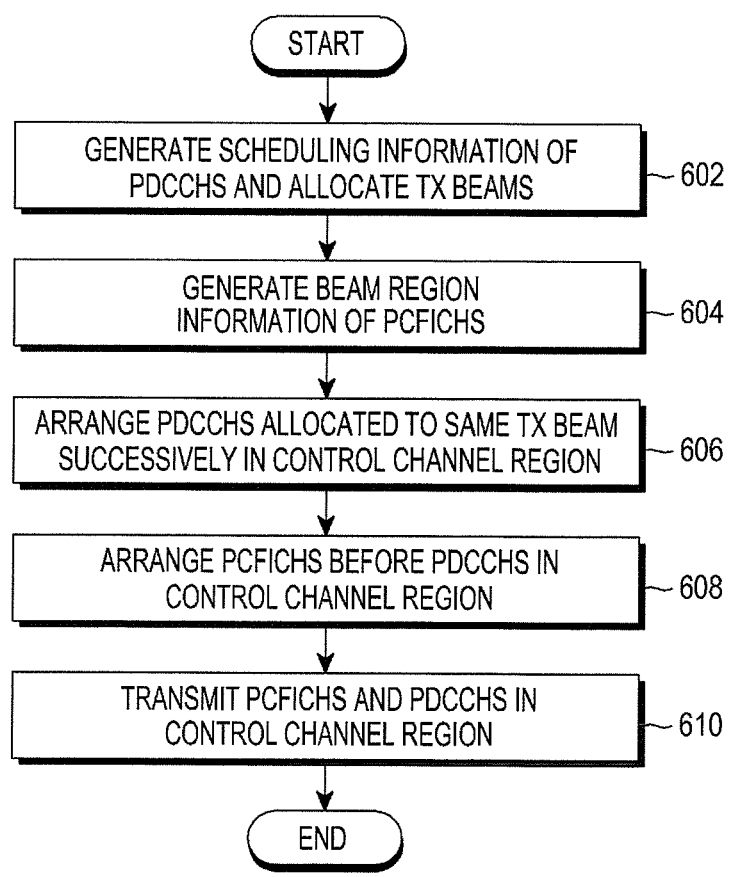
FIG. 6 illustrates a process for transmitting control information in a Base Station (BS) according to embodiments of the present disclosure.

FIG. 6 illustrates a process for transmitting control information in a BS according to embodiments of the present disclosure. Scheduling information transmitted on a PDCCH will be taken as an example of control information.

Referring to FIG. 6, the BS schedules MS s that want to communicate, generates scheduling information for transmission data packets according to the scheduling result, for transmission on PDCCHs, and allocates Tx beams to the PDCCHs in block 602. In block 604, the BS generates beam region information to be transmitted on PCFICHs associated with the PDCCHs. Each PCFICH indicates a resource region carrying at least one PDCCH to be transmitted by the same Tx beam, that is, the size and/or position of a beam region. The scheduling information generation and the beam region information generation involve generation, coding, and modulation of information bits.

In block 606, the BS arranges the scheduling information of PDCCHs allocated to the same Tx beams in a control channel region defined at the start of a subframe. The BS arranges the PCFICHs before the PDCCHs in the control channel region in block 608. Herein, each of the PCFICHs are disposed before a PDCCH(s) allocated to the same Tx beam in the configuration of FIG. 4A/4B or the PCFICHs are arranged successively before all PDCCHs in the configuration of FIG. 5. In embodiments of the present disclosure, the PCFICHs and the PDCCHs are arranged in the order of the beam indexes of Tx beams corresponding to the PCFICHs and the PDCCHs.

In block 610, the BS transmits the PCFICHs and the PDCCHs by Tx beams allocated to the PCFICHs and the PDCCHs in the control channel region. Each PCFICH is transmitted by the same Tx beam as applied to a PDCCH(s) associated with the PCFICH.

Figure 7:
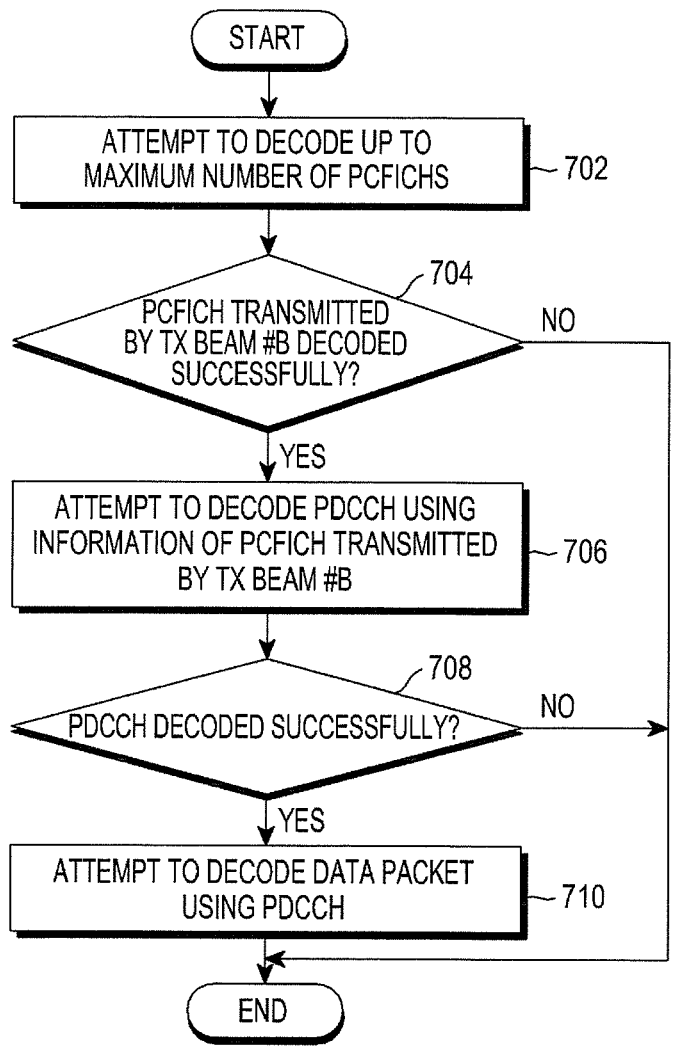
FIG. 7 illustrates a process for receiving control information in a Mobile Station (MS) according to embodiments of the present disclosure.

FIG. 7 illustrates a process for receiving control information in a MS according to embodiments of the present disclosure.

Referring to FIG. 7, the MS attempts to sequentially decode as many PCFICH resource units as a maximum number B of Tx beams transmittable simultaneously by a BS (i.e. up to B PCFICH resource units) in block 702. In certain embodiments of the present disclosure, the MS decodes up to B PCFICH resource units according to the number B of Tx beams allocated for PCFICHs in a current subframe. The number of Tx beams for PCFICHs in the current subframe is fixed or is broadcast in system information by the BS.

If the configuration of FIG. 4A or FIG. 4B is used, the MS attempts to sequentially decode all resource units available for PCFICH transmission in a control channel region, for example, signals detected in every fourth resource unit of the control channel region. If the configuration of FIG. 5 is used, the MS attempts to sequentially decode signals detected from B PCFICH resource units located at the start of the control channel region. The maximum number B of Tx beams is determined according to the configuration of the BS, particularly the number of Radio Frequency (RF) chains. For example, the MS determines the maximum number of available Tx beams from system information broadcast by the BS.

In block 704, the MS determines whether a PCFICH transmitted by Tx beam #b has been decoded successfully, referring to a best Tx beam (beam index #b) of the BS acquired by a beam tracking procedure (or a Tx beam allocated to a PDCCH of the MS). In embodiments of the present disclosure, while decoding a PCFICH in each PCFICH resource unit until the maximum number B of Tx beams is reached, the MS determines the Tx beam index of a decoded PCFICH. If the Tx beam index of the decoded PCFICH is identical to the index of the best Tx beam for the MS, the MS decodes an associated control channel, for example, PDCCH based on the PCFICH. In certain embodiments of the present disclosure, the MS descrambles a RS detected at a predetermined position of each PCFICH resource unit with a sequence corresponding to Tx beam #b and measures the signal power of the descrambled RS. Then the MS selects a PCFICH resource unit having the highest signal power measurement, decodes beam region information detected from the selected PCFICH resource unit, and determines whether an error has occurred to the beam region information. If no error has occurred, the MS detects and decodes an associated PDCCH using the beam region information of the PCFICH. On the other hand, if an error has occurred, the MS ends the procedure and sleep during the remaining period of the control channel region.

If the MS succeeds in decoding the beam region information in the PCFICH resource unit, the MS attempts to decode a PDCCH in a beam region indicated by the decoded beam region information in block 706. For example, if PCFICHs are arranged in the same order as PDCCHs and the MS determines that the selected PCFICH resource unit is disposed in the second place, the MS determines whether an error has occurred to control information by sequentially decoding control information detected from the second beam region using an ID of the MS. In block 708, the MS determines whether control information allocated to the MS in the beam region has been decoded successfully. If no control information without an error has been detected in the beam region, the MS ends the procedure, determining that no PDCCH has been allocated to the MS.

On the contrary, if the MS succeeds in decoding control information in the beam region, the MS receives and decodes a data packet based on the control information in block 710. After acquiring the intended control information, the MS sleeps during the remaining period of the control channel region, without performing detection and decoding of the following PCFICHs and control channels in the control channel region.

Figure 8:
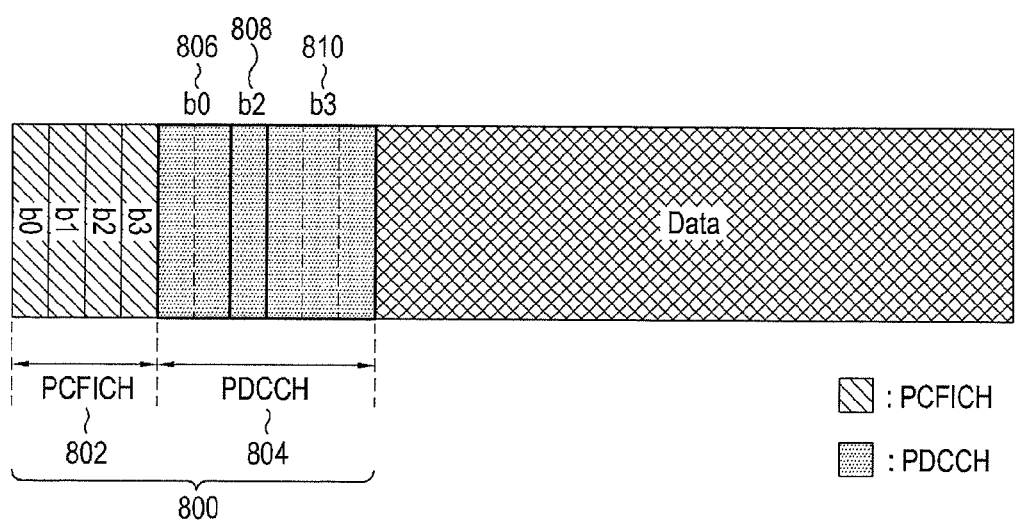
FIG. 8 illustrates a configuration of a control channel region according to embodiments of the present disclosure.

FIG. 8 illustrates a configuration of a control channel region according to certain embodiments of the present disclosure.

Referring to FIG. 8, a control channel region 800 includes a plurality of PCFICHs 802 and one or more PDCCHs 804. The size of the control channel region 800 is preset or is signaled to a MS in system information or control information by a BS. The PCFICHs 802 are configured to correspond to all Tx beams transmittable by the BS and the one or more PDCCHs 804 are arranged after the PCFICHs 802. Each PCFICH includes information about a beam region corresponding to the PCFICH (i.e., a beam index and/or size/position of the beam region). In the case where PCFICHs are transmitted for all Tx beams and the arrangement order of the PCFICHs is preset, none of the PCFICHs includes a beam index. The MS identifies the beam index of a beam region corresponding to a PCFICH by the sequence (position) of the PCIFCH. If the PCFICHs are transmitted in order, the MS detects a third-numbered PCFICH, for example, to acquire information about a PDCCH to which Tx beam b2 is allocated.

The total size of a region in which the PCFICHs 802 are arranged is fixed according to a maximum number N of Tx beams transmittable simultaneously by the BS. If no PDCCH is allocated to a specific Tx beam, for example, Tx beam 1, b1, beam region information of a PCFICH corresponding to Tx beam 1 is configured to include an information field indicating no PDCCH allocation to Tx beam 1, that is, the absence of a PDCCH allocated to Tx beam 1. The MS has prior knowledge of a DL Tx beam that the MS is supposed to receive and the size of beam region information of each PCFICH is preset. Therefore, the MS accurately determines the position of a PCFICH to be decoded. The MS can reduce its reception complexity by decoding only a PCFICH corresponding to a best Tx beam of the MS, for example, Tx beam 1, instead of decoding all of the PCFICHs 802.

Specifically, if Tx beams of the BS effective to the MS are Tx beam 0, b0 to Tx beam 3, b3, PCFICH 0 associated with Tx beam 0, b0, PCFICH 1 associated with Tx beam 1, b1, PCFICH 2 associated with Tx beam 2, b2, and PCFICH 3 associated with Tx beam 3, b3 are arranged, followed by two PDCCHs 806 allocated to Tx beam 0, b0, a PDCCH 808 allocated to Tx beam 2, b2, and three PDCCHs 810 allocated to Tx beam 3, b3, in the control channel region 800. Since no PDCCH is allocated to Tx beam 1, b1, the BS configures PCFICH 1 associated with Tx beam 1, b1 to indicate the absence of a corresponding beam region (i.e. PDCCH).

In certain embodiments of the present disclosure, each of the plurality of PCFICHs 802 disposed at the start of the control channel region 800 commonly includes information about all of the beam regions 806, 808, and 810 (e.g., the beam indexes and/or sizes of the beam regions 806, 808, and 810). Accordingly, a MS acquires information about the beam regions 806, 808, and 810 just by decoding one of the PCFICHs 802. Each PCFICH includes information about a PDCCH that is actually not transmitted (a PDCCH allocated to Tx beam b1 in FIG. 8). In this case, the PCFICH indicates the absence of a PDCCH for Tx beam b1. A MS allocated to Tx beam b1 receives a PCFICH of Tx beam 1. Upon recognition of the absence of a PDCCH allocated to the MS based on the received PCFICH, the MS ignores the remaining part of the control channel region.

Figure 9:
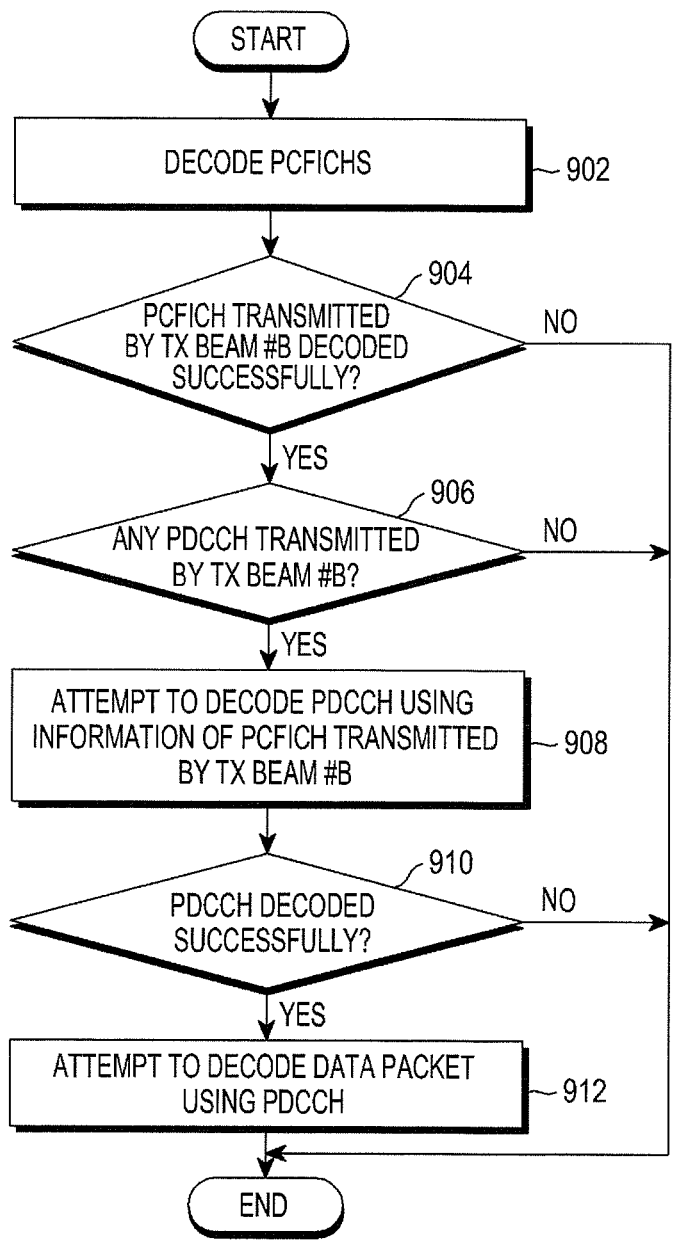
FIG. 9 illustrates a process for receiving control information in a MS according to embodiments of the present disclosure.

FIG. 9 illustrates a process for receiving control information in a MS according to certain embodiments of the present disclosure.

Referring to FIG. 9, the MS decodes a signal detected from a PCFICH resource unit corresponding to a best Tx beam, Tx beam #b from among B PCFICH resource units located at the start of a channel control region in the time domain according to a maximum number B of Tx beams transmittable simultaneously by a BS in block 902. For example, the MS detects a bth PCFICH resource unit from among the B PCFICH resource units. In certain embodiments of the present disclosure, the number of PCFICHs transmittable in a current subframe, that is, the number of Tx beams for PCFICHs in the current subframe is fixed or is broadcast in system information by the BS.

In block 904, the MS determines whether beam region information in the PCFICH resource unit corresponding to the best Tx beam, Tx beam #b has been successfully decoded. If the MS fails in decoding the beam region information, the MS ends the procedure.

On the other hand, if the MS succeeds in decoding the beam region information in the PCFICH resource unit corresponding to the best Tx beam, Tx beam #b, the MS determines whether the beam region information indicates the presence of at least one control channel, for example, PDCCH in block 906. In embodiments of the present disclosure, the beam region information explicitly indicates the absence of an associated PDCCH, or implicitly indicates the absence of an associated PDCCH by including no indicator. If the MS determines the absence of a PDCCH corresponding to the best Tx beam, Tx beam #b, the MS ends the procedure. In embodiments of the present disclosure, the MS sleeps until before a next PCFICH is transmitted. In certain embodiments of the present disclosure, the MS sleeps during the remaining period of the control channel region.

If the beam region information indicates the presence of a PDCCH corresponding to the best Tx beam, Tx beam #b, the MS attempts to decode a PDCCH(s) in a beam region indicated by the beam region information in block 908. For example, if the PDCCHs are separately encoded and the beam region information indicates a second beam region, the MS determines whether an error has occurred to control information by sequentially decoding control information of PDCCHs detected in the second beam region using an ID of the MS. If the PDCCHs are jointly decoded, the MS decodes the beam region. If the decoding is successful, the MS determines whether a corresponding PDCCH includes control information for the MS based on the ID of the MS.

In block 910, the MS determines whether control information of a PDCCH allocated to the MS in the beam region has been successfully decoded. If control information without an error has not been detected in the beam region, the MS ends the procedure, determining that no PDCCH has been allocated to the MS.

On the contrary, if the MS succeeds in decoding control information in the beam region, the MS receives and decodes a data packet using the control information of the PDCCH in block 912. After acquiring the intended control information, the MS sleeps during the remaining period of the control channel region after the intended PDCCH.

If PDCCHs included in one beam region are separately encoded, a search space being a resource region in which a MS attempts to decode a PDCCH is determined based on a Tx beam index applied to the PDCCH. The Tx beam index-based search space is narrowed down based on the ID of the MS. In certain embodiments of the present disclosure, the MS determines a search space based on its ID and narrow down the MS ID-based search space using the Tx beam index of a PDCCH.

Scheduling information of a PDCCH is transmitted in a user-specific search space or a common search space. If the user-specific search space is used, the MS determines the search space based on its ID. If the common search space is used, the MS determines the search space based on a Tx beam index.

Figure 10:
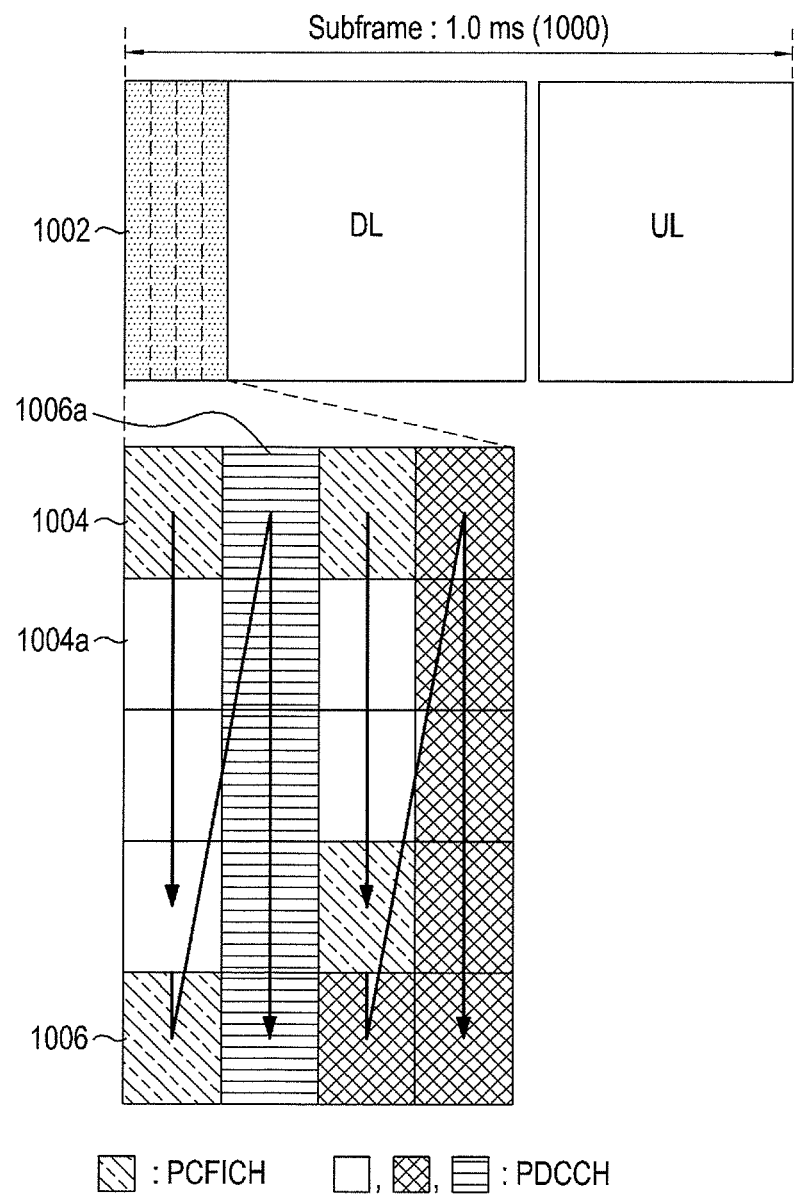
FIG. 10 illustrates a configuration of a control channel region according to embodiments of the present disclosure.

FIG. 10 illustrates a configuration of a control channel region according to certain embodiments of the present disclosure.

Referring to FIG. 10, a control channel region 1002 resides at the start of a subframe 1000 in the time domain. PCFICHs and beam regions corresponding to the PCFICHs are sequentially arranged in a frequency-first manner in a time-frequency area of the control channel region 1002. In the illustrated case of FIG. 10, the control channel region 1002 includes 4 time units (e.g., 4 OFDM symbols) on a horizontal axis by 5 frequency units (e.g., 5 subcarriers). A PCFICH occupies a 1×1 resource unit, that is, 1 time unit and 1 frequency unit and a beam region includes one or more resources units. A first PCFICH 1004 occupies a first resource unit of the control channel region 1002 and a first beam region 1004a corresponding to the first PCFICH 1004 occupies 3 resources units following the first PCFICH 1004 in the frequency domain. A second PCFICH 1006 occupies one resource unit following the first beam region 1004a and a second beam region 1006a corresponding to the second PCFICH 1006 occupies 5 resource units following the second PCFICH 1006 in the frequency domain or the first 5 resource units of the next time unit.

Beam region information transmitted on a PCFICH includes, for example, information about at least one of the size of a beam region indicated by the beam region information (or the number of PDCCHs included in the beam region), the type of PDCCHs transmitted in the beam region, the size of scheduling information transmitted on the PDCCHs, and a MCS applied to the PDCCHs.

The MS sequentially decodes the resource units of the control channel region 1002. Upon detection of beam region information transmitted on a PCIFCH corresponding to an intended Tx beam Identifier (ID), the MS starts to attempt to decode PDCCHs at the next resource position. The number of PDCCHs that the MS is supposed to attempt to detect, that is, a length to the next PCFICH is indicated by the beam region information.

Figure 11A:
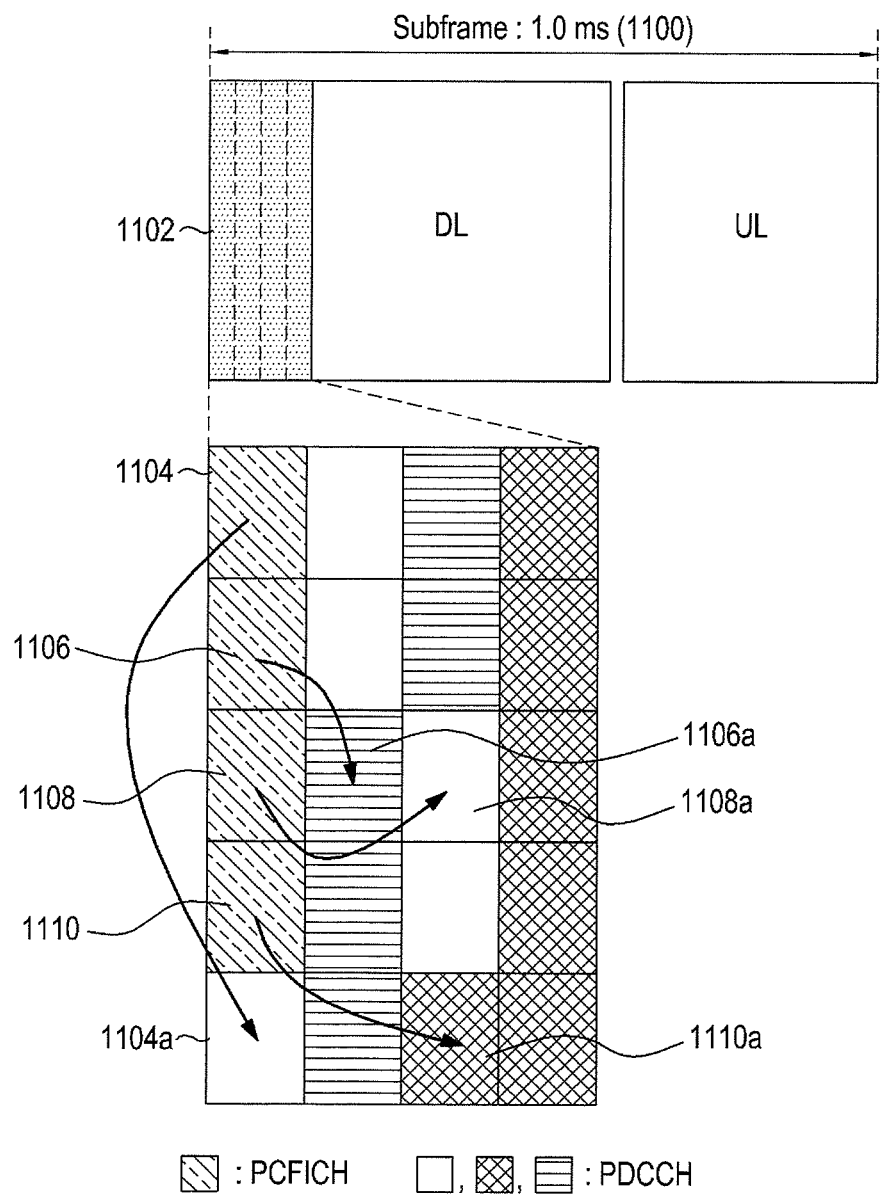
FIG. 11A illustrates a configuration of a control channel region according to embodiments of the present disclosure.

FIG. 11A illustrates a configuration of a control channel region according to certain embodiments of the present disclosure.

Referring to FIG. 11A, a control channel region 1102 resides at the start of a subframe 1100 in the time domain. All PCFICHs and beam regions corresponding to the PCFICHs are sequentially arranged in a frequency-first manner in a time-frequency area of the control channel region 1102. That is, all PCFICHs are first arranged, followed by the beam regions corresponding to the PCFICHs. In the illustrated case of FIG. 11A, the control channel region 1102 includes 4 time units (e.g., 4 OFDM symbols) on a horizontal axis by 5 frequency units (e.g., 5 subcarriers) on a vertical axis. A PCFICH occupies a 1×1 resource unit, that is, 1 time unit and 1 frequency unit and a beam region includes one or more resources units. 4 PCFICHs 1104, 1106, 1108, and 1110 are arranged along the frequency axis, followed by 4 beam regions 1104a, 1106a, 1108a, and 1110a corresponding to the PCFICHs 1104, 1106, 1108, and 1110 along the frequency axis in the control channel region 1102. A first frequency unit of the next time unit is used after the last frequency unit of each time unit. Beam region information transmitted on each PCFICH includes, for example, information about at least one of a beam index of a beam region corresponding to the PCFICH, the position and size of the beam region, the type of control channels transmitted in the beam region, the size of control information transmitted on the control channels, and a MCS applied to the control channels.

The MS detects beam region information in a PCFICH resource unit corresponding to an intended Tx beam ID from among PCFICH resource units of the control channel region 1102 and starts to attempt to decode PDCCHs at a resource position indicated by the beam region information. The number of PDCCHs that the MS is supposed to attempt to detect, that is, a length to the next PCFICH is indicated by the beam region information.

Figure 11B:
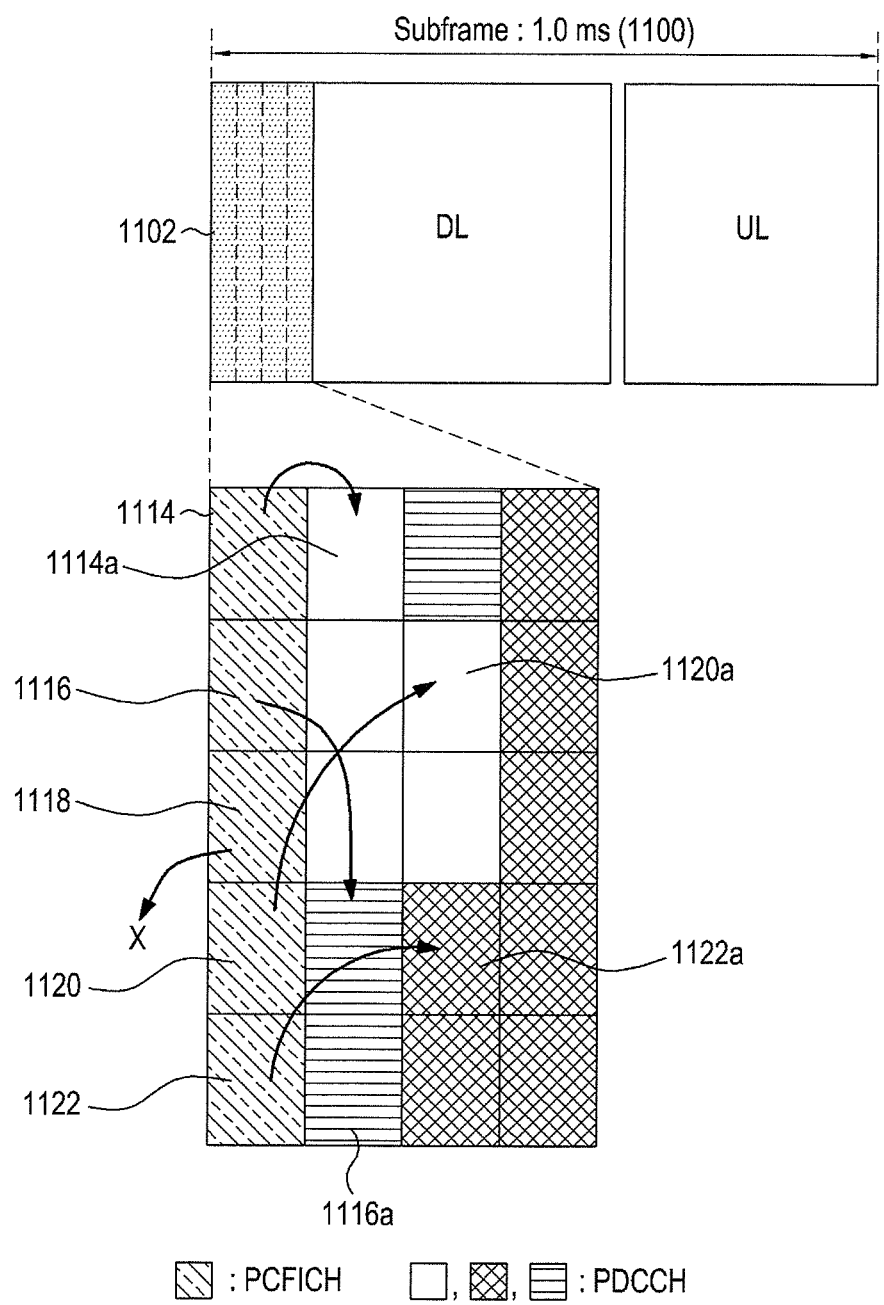
FIG. 11B illustrates a configuration of a control channel region according to embodiments of the present disclosure.

FIG. 11B illustrates a configuration of a control channel region according to certain embodiments of the present disclosure.

Referring to FIG. 11B, the control channel region 1102 resides at the start of the subframe 1100 in the time domain. All PCFICHs and beam regions corresponding to the PCFICHs are sequentially arranged in a frequency-first manner in a time-frequency area of the control channel region 1102. That is, all PCFICHs are first arranged, followed by the beam regions corresponding to the PCFICHs. In the illustrated case of FIG. 11B, the control channel region 1102 includes 4 time units (e.g., 4 OFDM symbols) on a horizontal axis by 5 frequency units (e.g., 5 subcarriers) on a vertical axis. A PCFICH occupies a 1×1 resource unit, that is, 1 time unit and 1 frequency unit and a beam region includes one or more resources units.

Five (5) PCFICHs 1114, 1116, 1118, 1120, and 1122 corresponding to all Tx beams of a BS, available to a MS are arranged along the frequency axis, followed by 4 beam regions 1114a, 1116a, 1120a, and 1122a along the frequency axis in the control channel region 1102. A first frequency unit of the next time unit is used after the last frequency unit of each time unit. Beam region information transmitted on each PCFICH includes, for example, information about at least one of the position and size of a beam region corresponding to the PCFICH, the type of control channels transmitted in the beam region, the size of control information transmitted on the control channels, and a MCS applied to the control channels. A specific PCFICH 1118 includes information about a PDCCH that is actually not transmitted (a PDCCH allocated Tx beam b1 in FIG. 11B). In this case, the PCFICH 1118 indicates no PDCCH allocation (shown in FIG. 11B as reference character X) to Tx beam 1. In an optional embodiment of the present disclosure, beam region information transmitted on each PCFICH commonly includes information about all beam regions as well as information about a beam region corresponding to the PCFICH.

A MS detects beam region information in a PCFICH resource unit corresponding to an intended Tx beam ID from among PCFICH resource units of the control channel region 1102 and starts to attempt to decode a PDCCH at a resource position indicated by the beam region information. The number of PDCCHs that the MS is supposed to attempt to detect, that is, a length to the next PCFICH is indicated by the beam region information. In certain embodiments of the present disclosure, the MS detects beam region information corresponding to an intended Tx beam by detecting only the first PCFICH or a PCFICH transmitted on the MS's best Tx beam.

Figure 12:
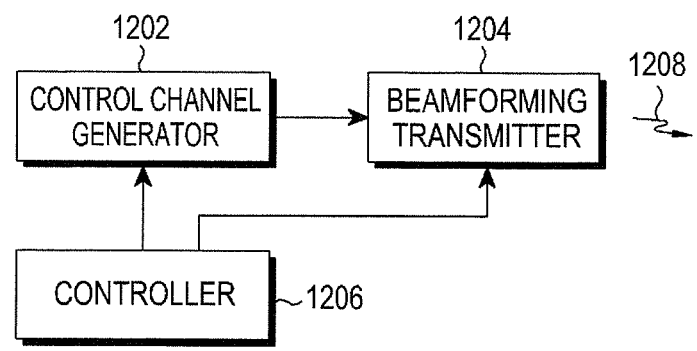
FIG. 12 illustrates a block diagram of a BS transmitter according to embodiments of the present disclosure.

FIG. 12 illustrates a block diagram of a BS transmitter according to embodiments of the present disclosure. A BS includes a control channel generator 1202, a beamforming transmitter 104, and a controller 1206.

Referring to FIG. 12, the control channel generator 1202 generates scheduling information to be transmitted on PDCCHs for a plurality of MSs according to a scheduling result of the controller 1206, allocates Tx beams to the PDCCHs, and generates beam region information about beam regions each carrying a PDCCH(s) allocated to the same Tx beam, to be transmitted on PCFICHs. Subsequently, the control channel generator 1202 allocates the PCFICHs and the PDCCHs in a control channel region in one of the foregoing embodiments of the present disclosure. The beamforming transmitter 1204 transmits information 1208 of the PCFICHs and the PDCCHs to the MSs by Tx beams selected for the MSs. While not shown, a data channel transmitter transmits a data packet(s) to a MS according to scheduling information of a PDCCH.

Figure 13:
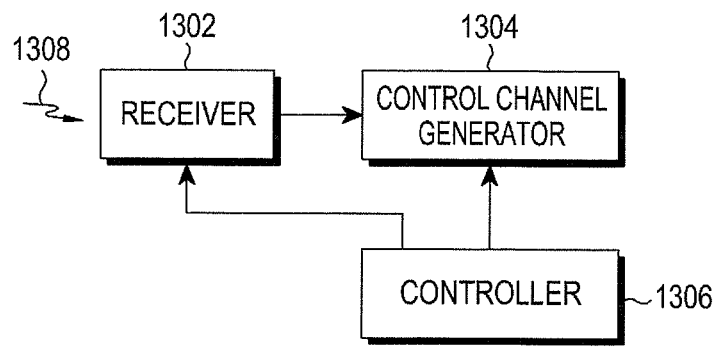
FIG. 13 illustrates a block diagram of a MS receiver according to embodiments of the present disclosure.

FIG. 13 is a block diagram of a MS receiver according to embodiments of the present disclosure. A MS includes a receiver 1302, a control channel detector 1304, and a controller 1306.

Referring to FIG. 13, the receiver 1302 detects a signal 1308 in a control channel region under the control of the controller 1306 and provides the detected signal to the control channel detector 1304. The control channel detector 1304 detects beam region information of a PCFICH related to the MS in one of the foregoing embodiments of the present disclosure and detects a PDCCH in a beam region indicated by the detected beam region information. While not shown, a data channel receiver receives a data packet(s) according to scheduling information of the detected PDCCH.

The proposed method and apparatus for transmitting and receiving a control channel by beamforming in a wireless communication system can be implemented as computer-readable code in a computer-readable recording medium. The computer-readable recording medium includes any kind of recording device storing computer-readable data. Examples of the recording medium includes Read Only Memory (ROM), Random Access Memory (RAM), optical disk, magnetic tape, floppy disk, hard disk, non-volatile memory, and the like, and can also include the medium that is implemented in the form of carrier waves (for example, transmission over the Internet). In addition, the computer-readable recording medium can be distributed over the computer systems connected over the network, and computer-readable codes can be stored and executed in a distributed manner.

Although the present disclosure has been described with an embodiment, various changes and modifications may be suggested to one skilled in the art. It is intended that the present disclosure encompass such changes and modifications as fall within the scope of the appended claims.

What is claimed is:

1. A method for transmitting control information in a wireless communication system, the method comprising:
generating a plurality of control information sets including resource allocation information for data transmission;
identifying transmission beams for use in beamforming transmission of the plurality of control information sets;
generating a first control format indication related to at least two first control information sets corresponding to a same first transmission beam from among the plurality of control information sets, wherein:
the at least two first control information sets are successively arranged in a control channel resource region,
the first control format indication includes information about the first transmission beam and information about a resource region within the control channel resource region in which the at least two first control information sets are arranged, and
the first control format indication is arranged before the at least two first control information sets;
transmitting a control signal including the first control format indication and the at least two first control information sets on the control channel resource region; and
performing data transmission with at least one mobile station based on the control signal.

2. The method of claim 1, wherein the first control format indication includes: a position of the resource region, a number of the at least two first control information sets included in the resource region, a type of each of the at least two first control information sets, a position of each of the at least two first control information sets in the resource region, a size of each of the at least two first control information sets, and modulation and coding schemes (MCSs) of the at least two first control information sets.

3. The method of claim 1, wherein the control channel resource region includes one or more resource regions each including at least one control information set allocated to a same transmission beam, and a control format indication related to each resource region is arranged immediately before a corresponding resource region.

4. The method of claim 1, wherein the control channel resource region includes one or more resource regions each including at least one control information set allocated to a same transmission beam, and one or more control format indications related to the one or more resource regions and arranged before all of the resource regions.

5. The method of claim 4, wherein the one or more control format indications related to the one or more resource regions are arranged in a same order of the resource regions.

6. The method of claim 1, wherein the control channel resource region includes one or more resource regions each including at least one control information set allocated to a same transmission beam and a plurality of control format indications related to transmission beams of a base station, respectively, and arranged before all of the resource regions, and wherein each of the control format indications indicates: presence or absence of a control information set allocated to a transmission beam related to a corresponding control format indication.

7. The method of claim 1, wherein the first control format indication includes a reference signal scrambled with a sequence mapped to the first transmission beam.

8. The method of claim 1, wherein the resource region includes control information allocated to a beam having a narrower beamwidth than the first transmission beam.

9. A method for receiving control information in a wireless communication system, the method comprising:

acquiring information about a preferred transmission beam of a base station for downlink transmission to a mobile station;

receiving, by the mobile station, a control signal on a control channel resource region having time-frequency resources from the base station, wherein:

the control signal includes a first control format indication and at least two first control information sets corresponding to a same first transmission beam, the at least two first control information sets are successively arranged in the control channel resource region, the first control format indication includes information about the first transmission beam and information about a resource region within the control channel resource region in which the at least two first control information sets are arranged, and the first control format indication is arranged before the at least two first control information sets;

acquiring the first control format indication corresponding to the preferred transmission beam from the control signal;

acquiring a control information set from the at least two first control information sets indicated by the first control format indication; and performing data transmission with the base station on the control information set, wherein the at least two first control information sets are transmitted from the base station using the same first transmission beam.

10. The method of claim 9, wherein the first control format indication includes: a position of the resource region, a number of the at least two first control information sets, a type of each of the at least two first control information sets, a position of each of the at least two first control information sets in the resource region, a size of each of the at least two first control information sets, and modulation and coding schemes (MCSs) of to the at least two first control information sets.

11. The method of claim 9, wherein the control channel resource region includes one or more resource regions each including at least one control information set allocated to a same transmission beam, and a control format indication related to each resource region is arranged immediately before a corresponding resource region.

12. The method of claim 9, wherein the control channel resource region includes one or more resource regions each including at least one control information set allocated to a same transmission beam, and one or more control format indications related to the one or more resource regions and arranged before all of the resource regions.

13. The method of claim 12, wherein the one or more control format indications related to the one or more resource regions are arranged in a same order of the resource regions.

14. The method of claim 9, wherein the control channel resource region includes one or more resource regions each including at least one control information set allocated to a same transmission beam and a plurality of control format indications related to transmission beams of the base station, respectively, and arranged before all of the resource regions, and wherein each of the control format indications indicates: presence or absence of a control information set allocated to a transmission beam related to a corresponding control format indication.

15. The method of claim 9, wherein the first control format indication includes a reference signal scrambled with a sequence mapped to the preferred transmission beam.

16. The method of claim 9, wherein the resource region includes control information allocated to a beam having a narrower beamwidth than the preferred transmission beam.

17. A base station for transmitting a control channel by beamforming in a wireless communication system, the base station comprising:

a controller configured to:

generate a plurality of control information sets including resource allocation information for data transmission, identify transmission beams for use in beamforming transmission of the plurality of control information sets, and generate a first control format indication related to at least two first control information sets corresponding to a same first transmission beam from among the plurality of control information sets, wherein:

the at least two first control information sets are successively arranged in a control channel resource region, the first control format indication includes information about the first transmission beam and information about a resource region within the control channel resource region in which the at least two first control information sets are arranged, and the first control format indication is arranged before the at least two first control information sets; and a transmitter configured to:

transmit a control signal including the first control format indication and the at least two first control information sets on the control channel resource region, and perform data transmission with at least one mobile station based on the control signal.

18. The base station of claim 17, wherein the first control format indication includes: a position of the resource region, a number of the at least two first control information sets included in the resource region, a type of each of the at least two first control information sets, a position of each of the at least two first control information sets in the resource region, a size of each of the at least two first control information sets, and modulation and coding schemes (MCSs) of the at least two first control information sets.

19. The base station of claim 17, wherein the control channel resource region includes one or more resource regions each including at least one control information set allocated to a same transmission beam, and a control format indication related to each resource region and arranged immediately before a corresponding resource region.

20. The base station of claim 17, wherein the control channel resource region includes one or more resource regions each including at least one control information set allocated to the same transmission beam, and one or more control format indications related to the one or more resource regions and arranged before all of the resource regions.

21. The base station of claim 20, wherein the one or more control format indications related to the one or more resource regions are arranged in a same order of the resource regions.

22. The base station of claim 17, wherein the control channel resource region includes one or more resource regions each including at least one control information set allocated to a same transmission beam and a plurality of control format indication related to transmission beams of the base station, respectively, and arranged before all of the resource regions, and
wherein each of the control format indications indicates: presence or absence of a control information set allocated to a transmission beam related to a corresponding control format indication.

23. The base station of claim 17, wherein the first control format indication includes a reference signal scrambled with a sequence mapped to the first transmission beam.

24. The base station of claim 17, wherein the resource region includes control information allocated to a beam having a narrower beamwidth than the first transmission beam.

25. A mobile station for receiving control information in a wireless communication system, the mobile station comprising:
a transceiver configured to receive a control signal on a control channel resource region having time-frequency resources from a base station, wherein
the control signal includes a first control format indication and at least two first control information sets corresponding to a same first transmission beam,
the at least two first control information sets are successively arranged in the control channel resource region,
the first control format indication includes information about the first transmission beam and information about a resource region within the control channel resource region in which the at least two first control information sets are arranged, and
the first control format indication is arranged before the at least two first control information sets; and
a processor configured to:
acquire information about a preferred transmission beam of the base station for downlink transmission to the mobile station, wherein the preferred transmission beam is the first transmission beam,
acquire the first control format indication corresponding to the preferred transmission beam from the control signal,
acquire a control information set from the at least two first control information sets indicated by the first control format indication, and
wherein the at least two first control information sets are transmitted from the base station using the same first transmission beam.

26. The mobile station of claim 25, wherein the first control format indication includes: a position of the resource region, a number of the at least two first control information sets, a type of the at least two first control information sets, a position of each of the at least two first control information sets in the resource region, a size of each of the at least two first control information sets, and modulation and coding schemes (MCSs) of the at least two first control information sets.

27. The mobile station of claim 25, wherein the control channel resource region includes one or more resource regions each including at least one control information set allocated to a same transmission beam, and a control format indication related to each resource region, and arranged immediately before a corresponding resource region.

28. The mobile station of claim 25, wherein the control channel resource region includes one or more resource regions each including at least one control information set allocated to the same transmission beam, and one or more control format indications related to the one or more resource regions and arranged before of the resource regions.

29. The mobile station of claim 28, wherein the one or more control format indications related to the one or more resource regions are arranged in a same order of the resource regions.

30. The mobile station of claim 25, wherein the control channel resource region includes one or more resource regions each including at least one control information set allocated to the same transmission beam and a plurality of control format indications related to transmission beams of the base station, respectively, and arranged before all of the resource regions, and
wherein each of the control format indications indicates: presence or absence of a control information set allocated to a transmission beam related to a corresponding control format indication.

31. The mobile station of claim 25, wherein the first control format indication includes a reference signal scrambled with a sequence mapped to the preferred transmission beam.

32. The mobile station of claim 25, wherein the resource region includes control information allocated to a beam having a narrower beamwidth than the preferred transmission beam.

* * * * *